United States Patent [19]

Erhardt et al.

[11] Patent Number: 4,630,402

[45] Date of Patent: Dec. 23, 1986

[54] APPARATUS FOR THE MANUFACTURE OR MACHINING OF STRAIGHT OR HELICALLY TOOTHED WORKPIECES

[75] Inventors: Manfred Erhardt, Puchheim; Herbert Loos, Dorfen-Stadt; Josef Lohrer, Munich; Udo Schapp, Wessling; Karl-Josef Schaeferling, Dillingen; Walter Freundl, Eichenau, all of Fed. Rep. of Germany

[73] Assignee: Carl Hurth Maschinen und Zahnradfabrik GmbH & Co., Munich, Fed. Rep. of Germany

[21] Appl. No.: 692,437

[22] Filed: Jan. 17, 1985

[30] Foreign Application Priority Data

Jan. 27, 1984 [DE] Fed. Rep. of Germany ....... 3402724
Oct. 23, 1984 [DE] Fed. Rep. of Germany ....... 3438741

[51] Int. Cl.⁴ .............................................. B24B 19/00
[52] U.S. Cl. ............................. 51/105 GG; 51/95 GH; 51/26; 51/287
[58] Field of Search .............. 51/105 GG, 95 GH, 26, 51/287

[56] References Cited

U.S. PATENT DOCUMENTS

| | | | |
|---|---|---|---|
| 1,916,117 | 6/1933 | Robinson | 51/26 |
| 2,165,386 | 7/1939 | Klomp | 51/26 |
| 2,994,989 | 8/1961 | Bregi | 51/88 |
| 3,228,148 | 1/1966 | Wickman | 51/287 |

FOREIGN PATENT DOCUMENTS

| | | |
|---|---|---|
| 591916 | 9/1947 | United Kingdom . |
| 782717 | 9/1957 | United Kingdom . |
| 817423 | 7/1959 | United Kingdom . |

*Primary Examiner*—Harold D. Whitehead
*Attorney, Agent, or Firm*—Flynn, Thiel, Boutell & Tanis

[57] ABSTRACT

Apparatus for the manufacture or machining of straight of helically toothed gears with a hyperboloidally or globoidally or similarly formed toothed tool, which has an abrasive or similar surface and which has such an axial dimension that it covers the entire width of the workpiece tooth system. The axes of the workpiece and the tool cross and the workpiece and the tool are coupled to a guide gearing. The workpiece-tool pairing and the guide gearing each have their own (separate) crossed-axes point. Interchangeable gears can be provided between the workpiece-tool pairing.

According to a different embodiment, the axis of the guide gearing and the workpiece axis are arranged parallel to one another, also to another axis of the guide gearing and the tool axis. The parallel axes are coupled to one another through master gears and interchangeable gears.

6 Claims, 4 Drawing Figures

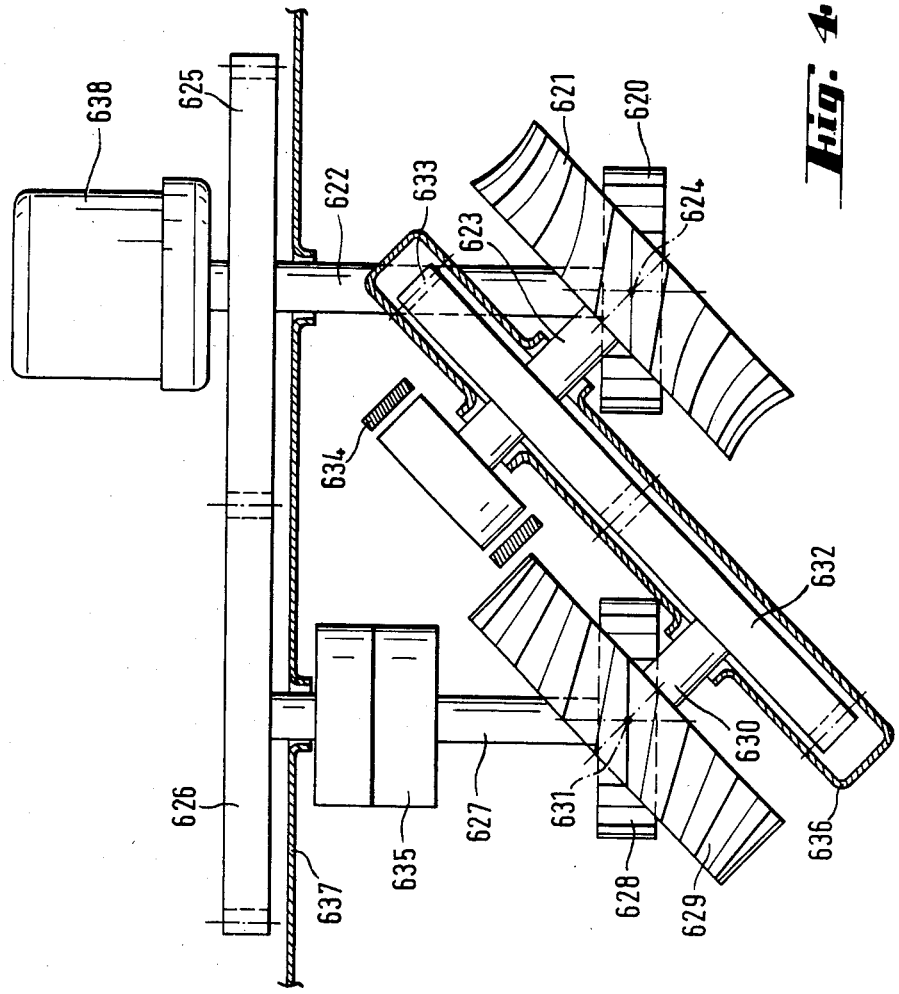

APPARATUS FOR THE MANUFACTURE OR MACHINING OF STRAIGHT OR HELICALLY TOOTHED WORKPIECES

CROSS REFERENCE TO RELATED APPLICATIONS

This application discloses subject matter that is related to subject matter disclosed in the following matters.
1. Ser. No. 816,946, filed Jan. 6, 1986, which is a continuation application of Ser. No. 576,672, filed Feb. 13, 1984, now abandoned.
2. Ser. No. 684,535, filed Dec. 21, 1984 now U.S. Pat. No. 4,602,458 issued 7-29-86.
3. Ser. No. 692,269, filed Jan. 17, 1985.

FIELD OF THE INVENTION

The invention relates to an apparatus for the manufacture of straight or helically toothed workpieces and, more particularly, to a device for controlling the operative flank of a tool tooth on a tooth of a workpiece.

BACKGROUND OF THE INVENTION

The invention disclosed herein is based on a state of the art which is known from German OS No. 33 04 980 (which corresponds to copending application Ser. No. 816,946, filed on Jan. 6, 1986, which is a continuation application of Ser. No. 576,672, filed Feb. 3, 1984, now abandoned, and is assigned to the same assignee as the present invention). With this apparatus it is possible to quickly machine hardened gears or those of a hard material, and a high surface quality and a high tooth-system quality is assured.

The term "abrasive surface" means a chip-removing surface of the tool that does not have any uniformly directed cutting edges or the like. This includes all tools having a granular working surface, for example grinding tools, however, also tools for electrolytic or electroerosive or electrochemical material removal. (This does not include for example toothed shaving tools.)

The known apparatus operates in such a manner that only one side of the tool teeth contacts the opposing flank of the workpiece teeth. On the other tooth side there exists a backlash spacing. The contacting tooth side can be changed during the machining operation. The guide gears can run without backlash. However, it is preferable, especially if the tool is moved by changing the center-distance between the tool and the workpiece, to let the guide gears also run with backlash, namely, in such a manner that, referred to the workpiece-tool pairing, the opposite tooth side is in contacting relation. In this manner it is achieved that both the workpiece-tool pairing and also the guide gear pairing operate with backlash, however, the entire gearing arrangement is without backlash. The known apparatus works practically without longitudinal feed. It is possible to use in place of the guide gears friction wheels or friction disks or the like, the manufacture of which is relatively simple. Care must be taken to assure that they have the correct translation characteristic therebetween.

In the known apparatus, only one single place is provided for the workpiece-tool pairing and for the guide gear pairing, at which place the vertically spaced axes cross and this is called the crossed-axes point or the common normal. A specific position or location for the crossed-axes point is not prescribed, namely, it can lie within the tooth width of the workpiece or the guide gear or outside of the tooth system, for example between the mentioned gears; it remains, however, that through this common crossed-axes point the design of the apparatus has limits. Also the tool or a guide gear or both can become very complicated. If, for example, the crossed-axes point lies within the workpiece-tool pairing, then the tool is relatively simple, the guide gears are, however, very complicated, because they must be a combination of a gear for crossed-axes and a bevel gear.

The basic purpose of the invention is to provide an apparatus which can be designed simpler, which can be reset simpler and in which the tool or/and the guide gears are simpler.

This purpose is inventively attained by providing an apparatus of the type described above in which the tool workpiece pairing and for a guide-gear pairing there is provided for each a separate crossed-axes point (common normal).

The invention can be further developed advantageously by providing between the workpiece-tool pairing and the guide gear pairing an interchangeable gear set.

In order that—while maintaining the separate crossed-axes points—both the workpiece-tool pair and also the guide-gears and the interchangeable gear set are well accessible from a servicing standpoint, the invention is preferably constructed so that the workpiece and the gear of the guide gearing that is coupled with the workpiece are arranged on shafts with parallel axes and which are connected to one another through a master gear set. Further, the tool and the gear of the guide gearing that is coupled to the tool can also be arranged on shafts with parallel axes and which are connected through an interchangeable gear set. A simplification results by fixedly installing the master gears in the apparatus.

The inventive apparatus can be simplified in its manufacture when the gears of the guide gear pairing are cylindrical spiral gears. This construction has a favorable effect on the expenses. Since the guide gears have a separate crossed-axes point which is independent of the workpiece-tool pairing, its tooth system can be manufactured independently from the shape or form of the tool tooth system.

BRIEF DESCRIPTION OF THE DRAWINGS

The invention will be discussed hereinbelow with reference to the exemplary embodiments which are illustrated in the drawings. Only those elements are illustrated in the drawings that are of importance to the invention. Bearings, feeding means and other parts, which are common in machine tools, are not illustrated. More specifically, and in the drawings:

FIG. 4 illustrates, also schematically, a further exemplary embodiment.

DETAILED DESCRIPTION

Figure 1:
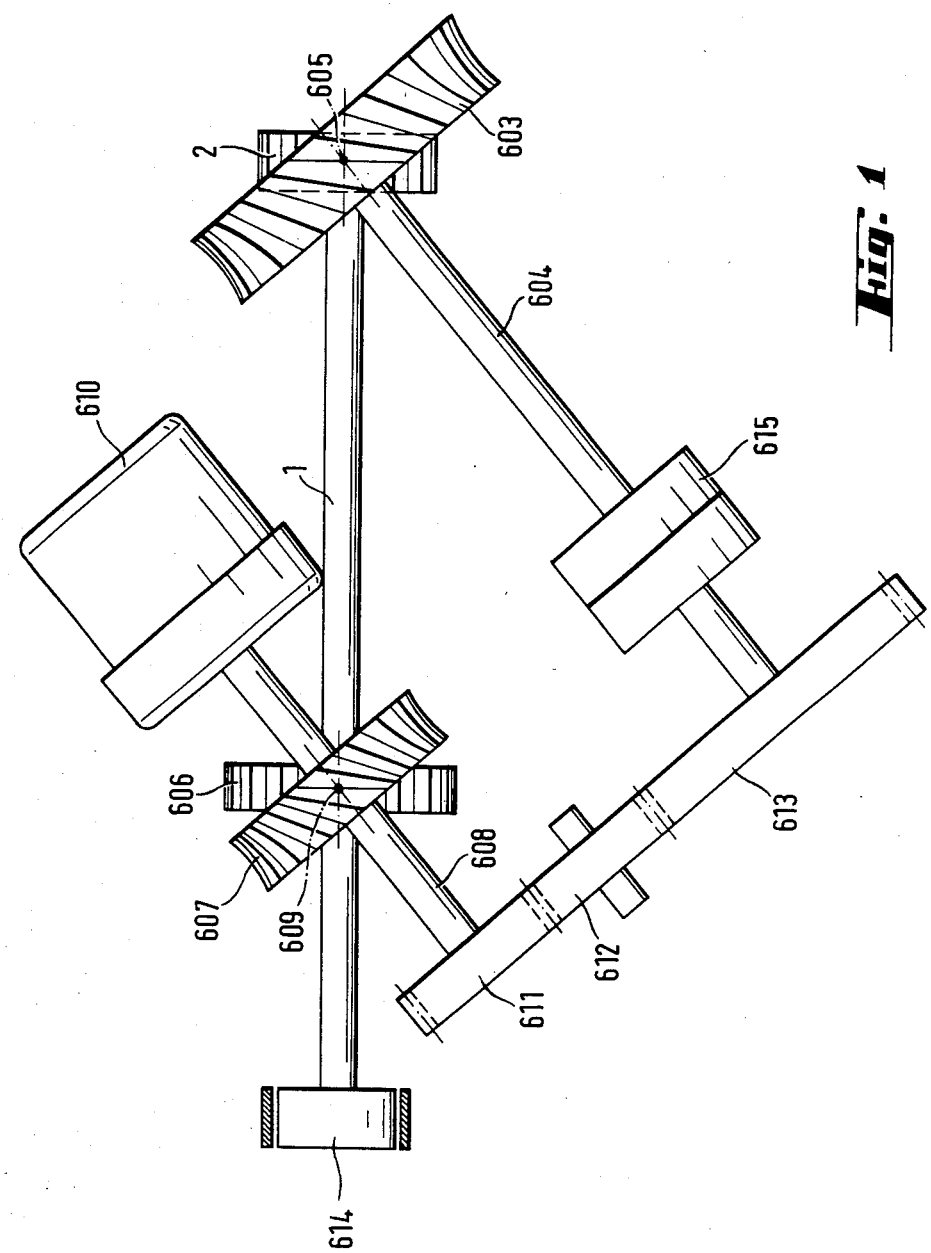
FIG. 1 schematically illustrates an apparatus according to the invention.

A workpiece 2, namely, a gear which is to be machined or worked, is exchangeably clamped to a workpiece spindle 1. The clamping device is known and is therefore not illustrated. The workpiece is machined by a tool 603 clamped exchangeably to a tool spindle 604. The axes of the workpiece and the tool or their spindles are vertically spaced and crossed. The crossing axes have a normal in common, which is positioned perpendicularly on the two axes. It is identified as the crossed-axes point in practice. In the example of FIG. 1, the crossed-axes point 605 lies within the tooth system; this, however, is not a necessary condition because it can also lie outside of the tooth system. The tool grips hyperboloidally or globoidally or similarly around the workpiece. The teeth of the tool contact the teeth of the workpiece only on one side thereof while backlash exists on the trailing side. The apparatus works in the plunge method, thus without a longitudinal feed; the teeth of the tool are therefore at least as wide as the teeth of the workpiece. The teeth of the tool have an abrasive surface at least on the working tooth flanks.

A first guide-gear 606 is mounted on the workpiece spindle 1 and mates with a second guide-gear 607. The guide-gear 607 is mounted on a drive shaft 608. The axes of the guide gears are vertically spaced and are crossed and form in this manner a second crossed-axes point 609. Each of the two gear pairs 2,603 and 606,607 thus has a separate crossed-axes point. The drive shaft 608 is on the one end thereof coupled with a motor 610, which can be operated for rotation in opposite directions. An interchangeable gear 611 is exchangeably mounted on the free end of the drive shaft 608 and mates with an intermediate gear 612. The intermediate gear 612 engages a second interchangeable gear 613 exchangeably mounted at the free end of the tool spindle 604. In this apparatus it is not necessary for the translation of the guide-gear pair 606, 607 to correspond with the translation of the workpiece tool pairing 603,2. It is only important that the translation of the entire gearing, which is formed by the guide gears and the interchangeable gears, corresponds with the speed ratio of the workpiece-tool pairing. Thus, if a different workpiece is to be machined or worked, the workpiece-tool pair is exchanged, the guide gear pair can stay the same, only the simpler interchangeable gears 611, 613 need to be exchanged. This is conditioned, however, on the crossed-axes angles remaining the same.

A brake 614 is provided at the free end of the workpiece spindle 1. A shiftable coupling 615 is mounted on the tool spindle 604.

The tooth flank which is to be machined is changed by a change in the direction of rotation of the motor 610, a suitable shifting of the coupling 615 and an operating of the brake 614. The tool spindle 604 and the drive shaft 608 are supported in a frame forming a part of the apparatus and which is not illustrated such that the crossed-axes angle for the workpiece spindle 1 can be selected.

Figure 2:
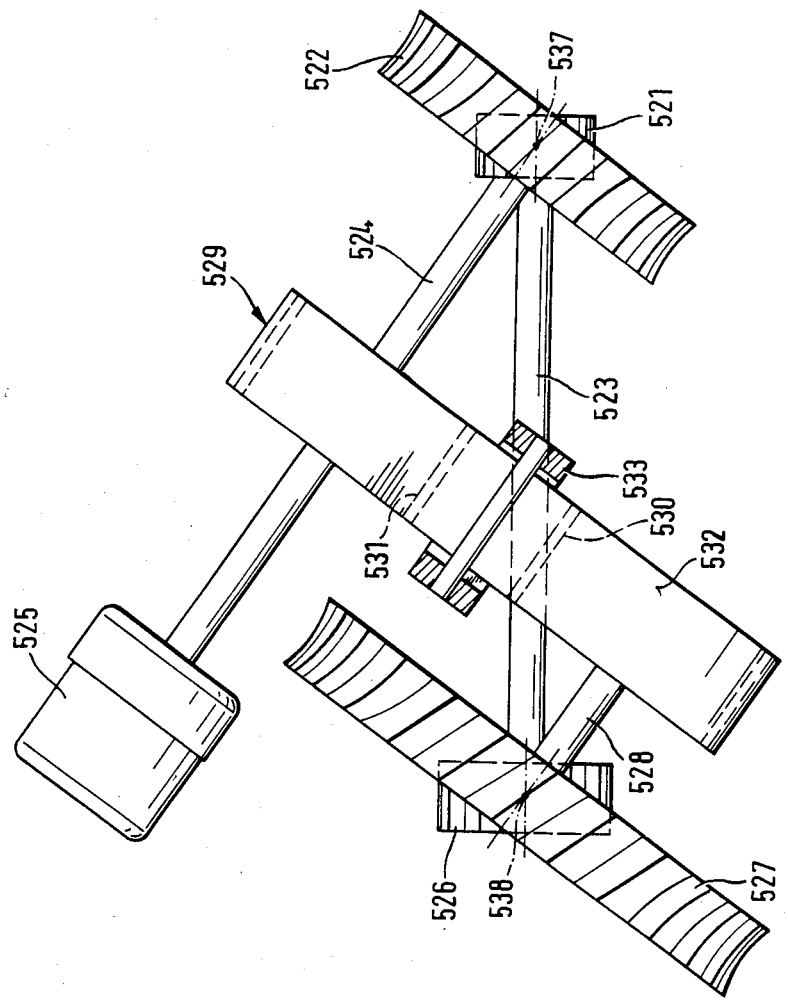
FIG. 2 illustrates a further exemplary embodiment and a development of a control gearing.
Figure 3:
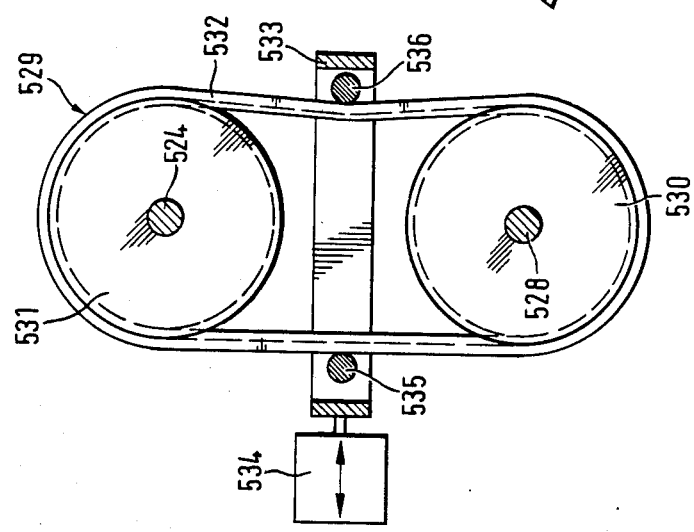
FIG. 3 schematically illustrates a cross-sectional detail of the control gearing of the apparatus according to FIG. 2.

In the exemplary embodiment according to FIGS. 2 and 3, the workpiece 521 is machined by a tool 522. The tool is designed in a manner as it was described above in connection with FIG. 1. The workpiece is exchangeably mounted on a workpiece spindle 523. The tool 522 is exchangeably mounted on a tool spindle 524. A motor 525 is provided at the free end of the tool spindle 524. A guide gear 526 is exchangeably mounted at the free end of the workpiece spindle 523, which guide gear 526 mates with a second guide gear 527. The axes of the workpiece and the tool on the one end and of the guide gears on the other end are vertically spaced and crossed. Each of the mentioned gearing sets has its own (separate) crossed-axes point (common normal) 537,538. The second guide gear 527 is exchangeably mounted on a shaft 528. The two gearings have the same speed ratios.

The tool spindle 524 and the shaft 528 are connected by means of a toothed belt or chain drive 529, which functions as a control gear. The toothed belt or chain drive gear consists substantially of a toothed disk 530 mounted on a shaft 528 and a second toothed disk 531 mounted on the tool spindle 524, an endless toothed belt 532 which encircles both disks 530 and 531. A clamping bar 533 is arranged between the toothed disks and grips around the toothed belt. The clamping bar 533 is movably supported in a direction perpendicular to a plane through the axes of the toothed disks 530,531 and can be driven for this movement by a motor 534. Two rollers 535,536 are supported on the inside portion of the clamping bar. Each roller, depending on the position of the clamping bar, contacts an outside portion of the toothed belt and deflects. By changing the effective one of the tensioning rollers, namely by changing the deflected reach of the toothed belt, the shafts 524,528 receive an additional fractional rotation with which selectively the one or the other side of the tool teeth contact the workpiece teeth.

The apparatus can also be used if designed accordingly for the manufacture of internally toothed workpieces or for machining of internally toothed tools.

A further embodiment is illustrated in FIG. 4. A workpiece 620, namely, a gear which is to be machined, can be clamped exchangeably on a workpiece spindle (shaft 622). The machining operation is done by a tool 621, which is clamped exchangeably on a tool spindle 623. The axes of the workpiece and the tool or their spindles are vertically spaced and crossed. The crossing axes have a normal in common, which extends perpendicularly between the two axes. The point, at which it penetrates through the tooth systems, is the so-called crossed-axes point 624. The tool 621 corresponds with respect to its shape and its operation to the tool 603.

A first master gear 625 is mounted on the shaft 622, which master gear 625 mates without backlash with a second master gear 626 mounted on a shaft 627 on which also a first guide gear 628 is exchangeably mounted. The guide gear 628 mates with a second guide gear 629. The guide gear 629 is also exchangeably mounted on a shaft 630. The axes of the guide gears are vertically spaced and are crossed and have a common normal which forms the crossed-axes point 631. The teeth of the two guide gears 628,629 are also in contact only on one side and backlash exists on the trailing edge.

In order that the system workpiece/tool/guide pair all together operate without backlash, the tool 621 and the second guide gear 629 are in addition coupled through interchangeable gears 632,633 which mate without backlash with one another. The interchangeable gear 633 is mounted on the tool spindle 623 and the interchangeable gear 632 is mounted on the shaft 630. Of the guide gears 628,629, one grips hyperboloidally or globoidally or similarly around the other one analogously with respect to the construction of the tool. The apparatus, however, is simple in design, when the guide gears 628,629—as illustrated in the drawing—are designed as cylindrical spiral gears. Of course, this design is also possible in the arrangements according to FIGS. 1 and 2.

The workpiece spindle or shaft 622 is coupled to a reversible motor 638, which can be changed between the two directions of rotation. A brake 634 is provided on the tool spindle 623 and a shiftable coupling 635 is provided on the shaft 627.

The tooth flank which is to be machined is changed by changing the direction of rotation of the motor 638, suitably shifting of the coupling 635 and operating the brake 634. The tool spindle 623 and the shaft 630 are supported on the not illustrated frame in the apparatus such that the crossed-axes angle with respect to the workpiece spindle 622 and the shaft 627 can be selected.

The two master gears 625,626 or their shafts 622,627 are preferably fixedly supported in the not illustrated frame, so that depending on the machining operation, only the interchangeable gears need be exchanged. It is thereby possible to support the master gears 625,626 and also the interchangeable gears 632,633 in a separate housing, for example, the housing 636, or they can be protected by other suitable means, for example, by a splash protection device against damaging effects created by tool abrasion or chips.

The master gears 625,626 and the interchangeable gears 632,633 are of the same size in the drawings, thus are illustrated with a speed ratio of 1:1. This, however, is not a necessity. The one set of gears can just as well have a translation to a faster speed and the other set of gears an equally large translation to a slower speed. Also it is not absolutely necessary that the translation of the guide gear pair 628,629 correspond with the translation of the workpiece-tool pairing 620,621. It is important in each case that the translation of the entire gearing, which is formed by the master gears, the guide gears and the interchangeable gears, correspond with the speed ratio of the workpiece-tool pair. Thus, if a different workpiece is to be machined, the workpiece-tool pair is changed, the guide gear pair can remain the same, and only the simpler interchangeable gears need to be exchanged. However, a condition for this is that the crossed-axes angles remain the same. Since with the crossed-axes angles, the center distance between the tool spindle 623 and the shaft 630 changes also, separate interchangeable gears must be provided for each crossed-axes angle at a 1:1 ratio for the interchangeable gears.

The apparatus is also suited for the manufacture or machining of internally toothed workpieces in a design which is slightly modified compared with FIG. 4. Instead of two interchangeable gears being utilized as this is illustrated, three interchangeable gears are then needed in order to adjust the direction of rotation of the tool 621 with the direction of rotation of the internally toothed workpiece. Three interchangeable gears are also needed, if machining is to be done with an internally toothed tool instead of, as illustrated, with an externally toothed one.

Although particular preferred embodiments of the invention have been disclosed in detail for illustrative purposes, it will be recognized that variations of modifications of the disclosed apparatus, including the rearrangement of the parts, lie within the scope of the present invention.

The embodiments of the invention in which an exclusive property or privilege is claimed are defined as follows:

1. In an apparatus for use in machining a tooth system of straight or helically toothed gears on a workpiece, said apparatus including a hyperboloidally or globoidally formed toothed tool having an abrasive surface on the teeth thereof and which has a sufficient axial dimension such that it meshingly engages said workpiece tooth system from one axially facing side thereof to the other and with normal backlash between the teeth thereof, first means defining a first crossed-axes angle relation between said workpiece and said tool, a first guide gear and first connecting means for coupling said first guide gear to said tool and being rotatable therewith, a second guide gear and second connecting means for coupling said second guide gear to said workpiece and being rotatable therewith, said first and second guide gears operatively engaging each other and having the same speed ratio as between said workpiece and said tool, said first and second guide gears operatively engaging each other and having normal backlash between the teeth thereof, and control means for controlling the relative positions between teeth on said workpiece and said tool and teeth on said first and second guide gears so that the operatively engaged combination of said workpiece/tool and said first guide gear/second guide gear is entirely backlash free, the improvement comprising wherein second means defines a second crossed-axes angle relation between said first guide gear and said second guide gear which, when meshingly engaged, is independent of said first crossed-axes angle relation.

2. The apparatus according to claim 1, wherein said first connecting means includes a set of interchangeable gears.

3. The apparatus according to claim 1, wherein said workpiece and said second guide gear are arranged on shafts with parallel axes, and wherein said parallel shafts are connected with one another through a set of master gears which define said second coupling means.

4. The apparatus according to claim 3, wherein said set of master gears are fixedly installed on said apparatus.

5. The apparatus according to claim 1, wherein said tool and said first guide gear are arranged on shafts with parallel axes, and wherein said parallel shafts are connected with one another through a set of interchangeable gears which defines said first coupling means.

6. The apparatus according to claim 1, wherein said first and second guide gears are cylindrical spiral gears.

* * * * *